Feb. 24, 1953  J. G. BAKER  2,629,285
HIGHLY CORRECTED TELEPHOTO OBJECTIVE LENS
Filed Aug. 7, 1951

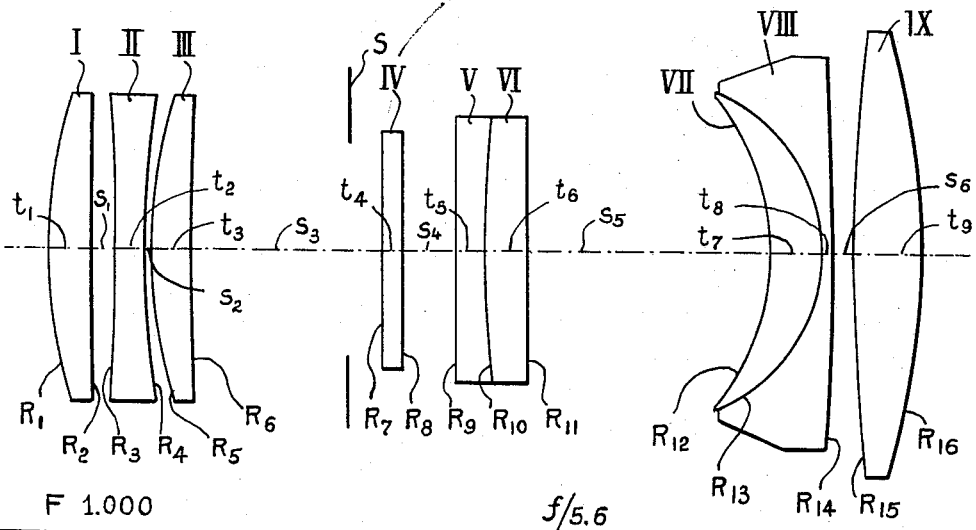

F 1.000  $f/5.6$

| LENS | RADII | | THICKNESSES | | $n_D$ | V | GLASS TYPES |
|---|---|---|---|---|---|---|---|
| I   | $R_1 =$ | 0.312  | $t_1 =$ | 0.027 | 1.5411 | 59.9 | 541599 |
|     | $R_2 =$ | 3.242  | $s_1 =$ | 0.014 |        |      |        |
| II  | $R_3 =$ | −1.621 | $t_2 =$ | 0.019 | 1.7506 | 27.7 | 751277 |
|     | $R_4 =$ | 0.597  | $s_2 =$ | 0.004 |        |      |        |
| III | $R_5 =$ | 0.324  | $t_3 =$ | 0.025 | 1.611  | 58.8 | 611588 |
|     | $R_6 =$ | 1.876  | $s_3 =$ | 0.120* |       |      |        |
| IV  | $R_7 =$ | plano  | $t_4 =$ | 0.013 | filter glass | | |
|     | $R_8 =$ | plano  | $s_4 =$ | 0.032 |        |      |        |
| V   | $R_9 =$ | 8.485  | $t_5 =$ | 0.019 | 1.517  | 64.5 | 517645 |
| VI  | $R_{10}=$ | 0.648 | $t_6 =$ | 0.026 | 1.720  | 29.3 | 720293 |
|     | $R_{11}=$ | plano | $s_5 =$ | 0.153 |        |      |        |
| VII | $R_{12}=$ | −0.148 | $t_7 =$ | 0.032 | 1.5411 | 59.9 | 541599 |
| VIII| $R_{13}=$ | −0.105 | $t_8 =$ | 0.006 | 1.5256 | 54.6 | 526546 |
|     | $R_{14}=$ | −2.308 | $s_6 =$ | 0.013 |        |      |        |
| IX  | $R_{15}=$ | 1.037  | $t_9 =$ | 0.043 | 1.517  | 64.5 | 517645 |
|     | $R_{16}=$ | −0.463 |         | 0.350** |       |      |        |

\* The stop lies 0.100 from $R_6$ toward $R_7$.
\*\* Back focus.

INVENTOR
James G. Baker
BY
Pennie Edmonds Barrows Morton & Taylor
ATTORNEYS

Patented Feb. 24, 1953

2,629,285

UNITED STATES PATENT OFFICE 2,629,285

HIGHLY CORRECTED TELEPHOTO OBJECTIVE LENS

James G. Baker, Winchester, Mass., assignor to The Perkin-Elmer Corporation, Norwalk, Conn., a corporation of New York Application August 7, 1951, Serial No. 240,633

12 Claims. (Cl. 88—57)

This invention relates to optical objectives for photographic purposes and is concerned more particularly with a novel objective of the telephoto type, that is, one in which the rear principal plane lies in front of or on the long conjungate side of the front surface of the objective. The new objective is corrected for spherical and chromatic aberrations, coma, astigmatism, field curvature, and distortion. In addition, the objective is characterized by color stabilization, that is, by elimination of the aberration known as variation of distortion with color. The objective is one having a telephoto ratio between about 0.77 and about 0.95, that ratio being the ratio of the axial length of the objective between the forward vertex of the front element of the system and the focal plane to the equivalent focal length of the system.

Telephoto objectives are ordinarily of an asymmetrical construction and this leads to pronounced image aberrations. Compensation of these aberrations by a balancing of large internal aberrations against one another often leads to failure to meet the requirements for a good image at off-axis points. The factors influencing the choice of optimum solutions have been described in my copending application, Ser. No. 120,321, filed October 8, 1949, now Patent 2,576,436, issued November 27, 1951, and the principles set forth in that application have been applied and extended in the case of the present objective.

Telephoto objectives devised prior to the copending application are often afflicted with pincushion distortion, which becomes deleterious beyond acceptable tolerances when the field angle exceeds 10 degrees of off-axis. In aerial photography, a lens characterized by even a small amount of distortion is unacceptable for mapping purposes and, in the piecing together of mosaic aerial photographs, as used in reconnaissance, individual pictures with marked distortion fail to fit one another properly with resultant reduction in the value of the mosaic. The objective of the prior application is corrected for such distortion and, at any predetermined off-axis angle, it is possible to eliminate distortion entirely. The curve of distortion for the prior objective, when plotted against field angle, then shows a pincushion type of distortion as a residual in the intermediate field and a barrel type in the outer field, the residuals being quite small.

Unfortunately, in those types of telephoto objectives best suited for elimination of distortion and optimum correction of monochromatic aberrations over substantial field angles and at relatively large apertures, the factors of value in producing these effects are adverse in that they bring about retention of appreciable residuals of lateral color, an aberration also known as chromatic difference in magnification. Accordingly, certain prior objectives yielding excellent monochromatic correction for all aberrations including distortion, are still deficient in the correction of lateral color.

In ordinary telephoto objectives, lateral color is minimized by designing the objective to cause two principal rays of selected colors to be combined at a selected field angle. At points nearer the optical axis, the amplitude of the residual lateral color within the spectral range of interest may then prove small enough not to have a serious effect on the photographic resolution. However, in the outer part of the field, the amplitude of the residual lateral color increases with the field angle and at an increasing rate and, depending upon the spectral region of interest, there may be a distinct spectral spread of the principal rays in the outer field, which will react unfavorably on resolution in the tangential direction and will become increasingly serious as the focal length and field angle increase. Such deterioration in tangential resolution is sometimes confused with tangential astigmatism, although the latter aberration is usually monochromatic in character. As the aberrations of lateral color and astigmatism are additive, it is important that each be minimized so far as possible.

The present invention is directed to the provision of a novel telephoto lens, which is characterized by having the corrections previously identified and in which variation of distortion with color is eliminated. While the amplitude of the secondary spectrum in the lateral color increases with field angle in the new objective, the form of the curve is stable and, even at the extreme field angle, the ampltiude is so small that there is obtained sufficiently sharp resolution of the tangential lines, so far as lateral color is concerned. Finally, the residuals of lateral color are masked by secondary spectrum in the longitudinal color.

One form of the new objective is illustrated in the single figure of the drawing and the table of data for that objective is as follows:

[F 1.000  f/5.6]

| Lens | Radii | Thicknesses | $n_D$ | V | Glass Types |
|---|---|---|---|---|---|
| I | $R_1 = 0.312$ | $t_1 = 0.027$ | 1.5411 | 59.9 | 541599 |
|   | $R_2 = 3.242$ | $s_1 = 0.014$ |  |  |  |
| II | $R_3 = -1.621$ | $t_2 = 0.019$ | 1.7506 | 27.7 | 751277 |
|   | $R_4 = 0.597$ | $s_2 = 0.004$ |  |  |  |
| III | $R_5 = 0.324$ | $t_3 = 0.025$ | 1.611 | 58.8 | 611588 |
|   | $R_6 = 1.876$ | $s_3 =^1 0.120$ |  |  |  |
| IV | $R_7 =$ plano | $t_4 = 0.013$ | filter glass |  |  |
|   | $R_8 =$ plano | $s_4 = 0.032$ |  |  |  |
| V | $R_9 = 8.485$ | $t_5 = 0.019$ | 1.517 | 64.5 | 517645 |
| VI | $R_{10} = 0.648$ | $t_6 = 0.026$ | 1.720 | 29.3 | 720293 |
|   | $R_{11} =$ plano | $s_5 = 0.153$ |  |  |  |
| VII | $R_{12} = -0.148$ | $t_7 = 0.032$ | 1.5411 | 59.9 | 541599 |
| VIII | $R_{13} = -0.105$ | $t_8 = 0.006$ | 1.5256 | 54.6 | 526546 |
|   | $R_{14} = -2.308$ | $s_6 = 0.013$ |  |  |  |
| IX | $R_{15} = 1.037$ | $t_9 = 0.043$ | 1.517 | 64.5 | 517645 |
|   | $R_{16} = -0.463$ | $^2 0.350$ |  |  |  |

$^1$ The stop lies 0.100 from $R^6$ toward $R_7$.
$^2$ Back focus.

in which $R_1$, $R_2$ ... represent radii of surfaces beginning at the left, $t_1$, $t_2$ ... represent the axial thicknesses of the individual elements, and $s_1$, $s_2$ ... represent the axial air separations between the components.

Objectives made in accordance with the invention comprise a positive group lying in front of the true stop of the system and air-spaced from a rear negative group. About midway between the front and rear groups and spaced therefrom is a hyperchromatic group lying in the vicinity of the stop. The objective may also include a filter in the air space between the front and rear groups, the filter normally lying in front of the hyperchromatic group and between that group and the stop.

The front positive group of the new objective is formed in accordance with the instructions contained in the co-pending application and, in the objective illustrated, consists of three single elements I, II, and III. Of these elements, the outer two, I, III, are positive and have indices of refraction ranging from 1.47 to 1.62 and V-values ranging from 55 to 70. The central element II is negative and has an index of refraction ranging from 1.60 to 1.80 and a V-value ranging from 25 to 38. The front group is chromatically overcorrected and, on the basis of extensive calculations, I have found that the radius of curvature $R_3$ of the front air surface of the negative element should range from $-0.8$ F to infinity.

The rear negative group in objectives of the invention consists of a front negative component air-spaced from a rear positive component and, in the objective illustrated, the front component is made up of elements VII and VIII and the rear component is a simple element IX. The components are made of glass types of about the same effective dispersion and, in a simple form of the new objective, each component may be a simple element and the glasses used for the two elements may be the same. In the objective illustrated, the rear component is a simple element but the component may be compounded. The effective dispersions of the two components range from 50 to 95.

A significant feature of the rear group of the new objective, which distinguishes it from the rear negative groups of prior telephoto objectives, is that the rear group of the new objective by reason of being made of glasses of V-values within the specified ranges is not fully corrected as a whole for either longitudinal or lateral color. It is sufficient to indicate this condition by saying that the most dispersive element of the rear group, whether part of either the positive or negative component and whether air-spaced from or compounded with one or more other elements, has a V-value ranging from 50 to 95. The use of such an element at once differentiates the new objective from prior telephoto objectives including rear groups, which are corrected for color, simply because adequate color correction cannot be achieved in any reasonable way, when the rear group includes no element of a glass with a V-value lower than 50. Use of the glass types referred to for the rear group of the new objective, accordingly, leaves the rear group in a state of over-correction for the system as a whole.

From calculations in connection with the new objective, I have found that, for desired correction of secondary astigmatism, the mean value of the index of refraction of the positive component of the rear group should lie within the range from 1.40 to 1.70. The term "mean value" is to be understood as referring to the numerical average of the indices of the constituents of the component, if it is compounded, and to the value of the index of the component, if it is a single element. With the rear component having such a mean index of refraction, the radius of curvature of the front surface of the component should range from 0.5 F to 2.0 F.

As explained in my co-pending application, telephoto objectives of the kind under discussion are highly sensitive to the radius of the front concave surface of the negative component, this radius being that designated $R_{12}$ in the drawing. The surface referred to is strongly curved to the left, and the radius $R_{12}$ is shorter in length than the distance from the vertex of the surface to the stop. The radius should range from $-0.125$ F to $-0.165$ F, since any substantial reduction in the lower limit will introduce unmanageable aberrations and any similar increase in the upper limit will make it impossible to correct the system spherically. Because of the strong curvature of the surface, the upper rim ray is strongly refracted upward at a rate, which grows rapidly as the distance of the image point off-axis increases. If this tendency is not controlled, the only alternative is to increase vignetting by holding the clear aperture of the component to a small value.

Because of the asymmetry of telephoto construction, there is a tendency to coma in the outer field, and the radial extent of such coma can reach undesirable values, so that it is essential that the design parameters be varied to control the comatic trend as much as possible. After the coma has been removed, it is important that the oblique spherical aberration and astigmatism remaining be also reduced to acceptable residuals.

I have found that, in the objective of the invention, it is possible to bring about an improved symmetry in the off-axis image and a reduction in the level of the oblique spherical aberration by incorporating a strongly curved positive meniscus element in the negative component of the rear group. It is essential that the index of refraction of the meniscus element be slightly greater than that of the negative element cemented to it, since, with this arrangement, the otherwise strong tendency of the upper rim ray to be over-corrected in the outer field is compensated. If the index of the added meniscus is higher than that of the adjacent negative element, the strongly curved cemented surface between the elements is positive in its refraction and the upper rim ray is then refracted strongly downward. In designing the negative component of the rear group, it is important to limit the drop in index across the cemented surface and to limit the curvature of that surface correspondingly in such a way as to obtain the most symmetrical off-axis image. If the index difference is too small and the curvature of the cemented surface is too great, then, in the outer part of the field, the upper rim ray will be over-corrected in a downward sense and inward coma will result. On the other hand, if the index difference is too large and the curvature of the cemented surface too small, then the upper rim ray will be only partially compensated and outward coma will result. I have found that the desired results may be obtained by making the positive meniscus element and the negative element cemented thereto of glasses having an index drop across the cemented surface ranging from 0.010 to 0.025. The lower portion of this range is suitable for telephoto objectives covering intermediate field angles, whereas the upper portion of the range is best suited for such objectives covering large field angles. The radius of the cemented surface should then range from $-0.09\ F$ to $-0.13\ F$. It is evident that the limits on the index drop and on the radius of the cemented surface depend on the field to be covered and on the aperture, and also depend on the percentage of vignetting to be tolerated.

The third group of the objective is a hyperchromatic group lying in the central air space between the front and rear groups and spaced a substantial distance from both groups and about midway between the groups. In the objective illustrated in the drawing, the central hyperchromatic group is a cemented doublet made up of elements V and VI, but this construction is not necessary and the group may consist of more than two elements and the elements of the component may be cemented or air-spaced elements. It is important only that the group have chromatic under-correction, or positive dispersion in the longitudinal color, and that the group lie between the front and rear groups and spaced a substantial distance therefrom and approximately centrally between the front and rear groups. The hyperchromatic group should have an over-all axial thickness not greater than $0.15\ F$, since, if the group has a greater thickness, the constituent elements are no longer together optically. The lower limit of axial thickness is set by the minimum physical thickness of two cemented elements of requisite power and such a lower limit need not be further specified.

The new power of the hyperchromatic group is small and may be either positive or negative, according to the requirements of the objective as a whole. If the power is positive and too great, the rear group must then become too greatly negative and the objective becomes too unsymmetrical for correction. On the other hand, if the power of the hyperchromatic group is negative and too great, the telephoto effect is reduced. I have found that for objectives having a telephoto ratio ranging from 0.77 to 0.95 the power of the hyperchromatic group should range from $$\frac{-0.25}{F} \text{ to } \frac{0.45}{F}$$

The hyperchromatic group should lie near the stop for the following reasons. When the group is thus placed, the principal rays, which by definition pass through the center of the stop, will in turn pass nearly through the optical center of the hyperchromatic group, and the group thus resembles a plane-parallel glass plate, which effects no appreciable dispersion of the principal rays. Accordingly, when the hyperchromatic group is placed near the stop, the longitudinal color can be corrected by the group with little or no further effect on the lateral color. A form of construction for the rear group, which favors correction of lateral color, can then be adopted and the remaining correction for longitudinal color can be achieved by proper design of the hyperchromatic group without further disturbing the correction for lateral color. It will be understood that these considerations are subject to change to produce a better compromise between image quality and a practical construction.

It is often convenient to employ a color filter in the space between the front and rear groups and, if the color filter is placed near the stop, the filter is smallest in clear aperture and a series of filters can be mounted on a turret head for convenient interchange, in accordance with normal practice. In the objective shown in the drawing, the stop S lies slightly to the left of the filter IV and interposition of the filter or filters is without appreciable effect on the expedients for minimizing lateral color errors previously described. When a filter is used, the minor aberrations introduced by its use and its effect on the spacing between the front and rear groups must be taken into account.

The hyperchromatic group produces a chromatic under-correction balancing the over-correction of the front and rear groups. In the objective illustrated, the hyperchromatic group is a cemented doublet consisting of a negative element in front of and cemented to a positive element. The negative element has an index of refraction ranging from 1.40 to 1.65 and a V-value ranging from 55 to 95. The positive element has an index of refraction ranging from 1.55 to 1.80 and its V-value ranges from 25 to 45.

In the specification and appended claims, the term "strongly curved" as applied to a surface is to be understood as meaning that the radius of the surface is not greater than $0.25\ F$. The term "effective dispersion" of a component is the V-value of the component as determined by the expression $$V = \frac{\phi}{\sum_i \frac{\phi_i}{V_i}}$$

in which V is dispersion, $\phi$ is power, and the denominator is the summation of the powers of the constituent elements of the component divided by the respective V-values.

The terms "over-corrected" and "under-corrected" as applied to the several groups are intended to refer to their state of correction in relation to the system as a whole.

I claim:

1. A telephoto objective having a telephoto ratio between about 0.77 and about 0.95, which comprises a front (long conjugate side) group of net positive effect, a rear (short conjugate side) group of net negative effect separated from the front group by an axial distance equal to at least 0.3 F and not exceeding about 0.4 F, F being the focal length of the system, and a hyperchromatic group lying between said front and rear groups and spaced a substantial distance from both groups, the hyperchromatic group having a power lying in the range from $$\frac{-0.25}{F} \text{ to } \frac{0.45}{F}$$

and being chromatically under-corrected for the system as a whole and the front and rear groups being individually chromatically over-corrected for the system as a whole, the under-correction of the hyperchromatic group balancing the total over-correction of the front and rear groups.

2. A telephoto objective as defined in claim 1, in which the rear negative group consists of a front negative component and a rear positive component, every element having a V-value of at least 50.

3. A telephoto objective as defined in claim 1, in which the rear negative group consists of a front negative component and a rear positive component, both components having effective V-values ranging from 50 to 95.

4. A telephoto objective as defined in claim 1, in which the rear negative group consists of a front negative component air-spaced from a rear positive component, the effective V-value of the positive component ranging from 50 to 95.

5. A telephoto objective as defined in claim 1, in which the rear negative group consists of a front negative component air-spaced from a rear positive component, the effective V-value of the positive component ranging from 50 to 95 and the front surface of the positive component having a radius of curvature ranging from 0.5 F to 2.0 F.

6. A telephoto objective as defined in claim 1, in which the rear negative group consists of a front negative component air-spaced from a rear positive component, the negative component consisting of a strongly curved positive meniscus element cemented to a negative element, the index of refraction of the positive element being greater than that of the negative element and the difference in index between the elements ranging from 0.010 to 0.025.

7. A telephoto objective as defined in claim 1, in which the rear negative group consists of a front negative component air-spaced from a rear positive component, the negative component consisting of a strongly curved positive meniscus element cemented to a negative element, the index of refraction of the positive element being greater than that of the negative element and the difference in index between the elements ranging from 0.010 to 0.025, the radius of curvature of the cemented surface ranging from $-0.09$ F to $-0.13$ F.

8. A telephoto objective as defined in claim 1, in which the central hyperchromatic group lies approximately mid-way between the front and rear groups and consists of a plurality of elements having a total axial thickness not greater than 0.15 F.

9. A telephoto objective as defined in claim 1, in which the central hyperchromatic group lies approximately mid-way between the front and rear groups and consists of a negative element of a V-value ranging from 55 to 95 cemented to a positive element of a V-value ranging from 25 to 45.

10. A telephoto objective as defined in claim 1, in which the central hyperchromatic group lies approximately mid-way between the front and rear groups and consists of a negative element having an index of refraction ranging from 1.40 to 1.65 lying in front of and cemented to a positive element having an index of refraction ranging from 1.55 to 1.80.

11. A telephoto objective having numerical data substantially as follows:

[F 1.000  f/5.6]

| Lens | Radii | Thicknesses | $n_D$ | V | Glass Types |
|---|---|---|---|---|---|
| I | $R_1 = 0.312$ | $t_1 = 0.027$ | 1.5411 | 59.9 | 541599 |
|   | $R_2 = 3.242$ | $s_1 = 0.014$ |  |  |  |
| II | $R_3 = -1.621$ | $t_2 = 0.019$ | 1.7506 | 27.7 | 751277 |
|   | $R_4 = 0.597$ | $s_2 = 0.004$ |  |  |  |
| III | $R_5 = 0.324$ | $t_3 = 0.025$ | 1.611 | 58.8 | 611588 |
|   | $R_6 = 1.876$ | $s_3 = {}^1 0.120$ |  |  |  |
| IV | $R_7 = $ plano | $t_4 = 0.013$ | filter glass |  |  |
|   | $R_8 = $ plano | $s_4 = 0.032$ |  |  |  |
| V | $R_9 = 8.485$ | $t_5 = 0.019$ | 1.517 | 61.5 | 517615 |
| VI | $R_{10} = 0.648$ | $t_6 = 0.026$ | 1.720 | 29.3 | 720293 |
|   | $R_{11} = $ plano | $s_5 = 0.153$ |  |  |  |
| VII | $R_{12} = -0.148$ | $t_7 = 0.032$ | 1.5411 | 59.9 | 541599 |
|   | $R_{13} = -0.105$ |  |  |  |  |
| VIII | $R_{14} = -2.308$ | $t_8 = 0.006$ | 1.5256 | 54.6 | 526546 |
|   |  | $s_6 = 0.013$ |  |  |  |
| IX | $R_{15} = 1.037$ | $t_9 = 0.043$ | 1.517 | 61.5 | 517615 |
|   | $R_{16} = -0.463$ | ${}^2 0.350$ |  |  |  |

[1] The stop lies 0.100 from $R_6$ toward $R_7$.
[2] Back focus.

in which $R_1, R_2 \ldots$ represent radii of surfaces beginning at the left, $t_1, t_2 \ldots$ represent the axial thicknesses of the individual elements, and $s_1, s_2 \ldots$ represent the axial air separations between the components.

12. A telephoto objective as defined in claim 1, in which the rear negative group consists of a front negative component and a rear positive component, and the rear positive component has an effective V-value exceeding that of the front negative component.

JAMES G. BAKER.

REFERENCES CITED

The following references are of record in the file of this patent:

UNITED STATES PATENTS

| Number | Name | Date |
|---|---|---|
| 560,460 | Aldis | May 19, 1896 |
| 1,584,271 | Bertele | May 11, 1926 |
| 1,584,272 | Bertele | May 11, 1926 |
| 1,863,099 | Bowen | June 14, 1932 |
| 2,378,170 | Aklin | June 12, 1945 |
| 2,382,669 | Schade | Aug. 14, 1945 |
| 2,541,485 | Schade et al. | Feb. 13, 1951 |
| 2,576,436 | Baker | Nov. 27, 1951 |